United States Patent
Oshio (10) Patent No.: US 8,640,540 B2
(45) Date of Patent: Feb. 4, 2014

(54) VIBRATING ELEMENT, VIBRATOR, AND ELECTRONIC APPARATUS

(75) Inventor: Masahiro Oshio, Shiojiri (JP)

(73) Assignee: Seiko Epson Corporation (JP)

( * ) Notice: Subject to any disclaimer, the term of this patent is extended or adjusted under 35 U.S.C. 154(b) by 497 days.

(21) Appl. No.: 12/984,068

(22) Filed: Jan. 4, 2011

(65) Prior Publication Data

US 2011/0162450 A1     Jul. 7, 2011

(30) Foreign Application Priority Data

Jan. 5, 2010    (JP) .................................. 2010-000450
Oct. 28, 2010  (JP) .................................. 2010-241837

(51) Int. Cl.
*G01P 15/097*    (2006.01)
*G01C 19/24*     (2006.01)
*G01P 3/44*      (2006.01)

(52) U.S. Cl.
USPC ...................... 73/504.04; 73/504.12; 73/662

(58) Field of Classification Search
USPC ........ 73/504.12, 504.14, 504.16, 504.04, 662
See application file for complete search history.

(56) References Cited

U.S. PATENT DOCUMENTS

2002/0157466 A1 * 10/2002 Terada et al. ............... 73/504.12
2006/0107739 A1 *  5/2006 Ogura ........................ 73/504.12
2010/0083756 A1 *  4/2010 Merz et al. .................. 73/504.12

FOREIGN PATENT DOCUMENTS

DE    102007017209 A1 * 10/2008 ............. G01C 19/56
JP        11-281364       10/1999

* cited by examiner

*Primary Examiner* — Peter MacChiarolo
*Assistant Examiner* — Rose M Miller
(74) *Attorney, Agent, or Firm* — Harness, Dickey & Pierce, P.L.C.

(57) ABSTRACT

A vibrating element includes: a first support portion and a second support portion; a first vibrating arm which extends along a first axis, one end of the first vibrating arm being connected to the first support portion; a second vibrating arm which extends along the first axis, one end of the second vibrating arm being connected to the second support portion; an oscillating member which is sandwiched between the other ends of the first vibrating arm and the second vibrating arm, and has openings; and detection arms which extend along a second axis perpendicular to the first axis from the inner walls of the openings of the oscillating member in plan view.

12 Claims, 6 Drawing Sheets

L-L' SECTION | M-M' SECTION

VIBRATING ELEMENT, VIBRATOR, AND ELECTRONIC APPARATUS

BACKGROUND

1. Technical Field

The present invention relates to a vibrating element, a vibrator, and an electronic apparatus using the same.

2. Related Art

An angular velocity sensor which detects a rotation angular velocity is widely used in a navigation system, a pose control system of various apparatuses, a shaking prevention device of a video camera or a digital still camera, and the like. In these electronic apparatuses, a vibrating element sensor which can be reduced in size is in widespread usage.

In the related art, an angular velocity sensor using a vibrating element is used in which a detection arm extending in an X-axis direction is provided in a vibrating base which is connected to a driving arm extending in a Y-axis direction from a fixing portion. In the vibrating element, the vibrating base is driven and vibrated in the X-axis direction, and the angular velocity around the Z axis is detected from vibration of the detection arm in the Y-axis direction based on Coriolis force. Meanwhile, the vibrating base is driven and vibrated in the Z-axis direction, and the angular velocity around the X axis is detected from vibration of the detection arm in the Y-axis direction based on Coriolis force (see JP-A-11-281364).

However, in the angular velocity sensor described in JP-A-11-281364, the detection arm extends outward from the vibrating base, causing an increase in the size of the vibrating element. The detection arm may collide with the inner wall of the package and may be damaged.

In the angular velocity sensor described in JP-A-11-281364, it is difficult to achieve high sensitivity by reducing the frequency difference between the driving mode of the driving arm and the detection mode of the detection arm, that is, a dephasing frequency.

SUMMARY

An advantage of some aspects of the invention is that it provides a high-accuracy angular velocity sensor which has a rotation shaft within the plane of a vibrator, is reduced in size, and has small vibration leakage.

The invention can be implemented by the following aspects or application examples.

Application Example 1

This application example of the invention provides a vibrating element which detects rotation through a piezoelectric effect based on Coriolis force caused by an angular velocity. The vibrating element includes at least two vibrating arms, one ends of which are fixed to support members and the other ends of which are arranged concentrically to be opposite each other, an oscillating member which is fixed to the other ends of the vibrating arms or has internal spaces formed as a single body, and detection arms which extend in a direction perpendicular to the arrangement axis of the vibrating arms from the walls of the internal spaces of the oscillating member inward of the internal spaces. The vibrating arms undergo bending vibration within a plane parallel to a plane including the extension direction of the detection arms, and when a direction perpendicular to the vibration direction of the bending vibration is a thickness direction, the thickness of each of the detection arms is smaller than the thickness of each of the vibrating arms.

Another aspect of the invention provides a vibrating element. The vibrating element includes a first support portion and a second support portion, a first vibrating arm which extends along a first axis, one end of the first vibrating arm being connected to the first support portion, a second vibrating arm which extends along the first axis, one end of the second vibrating arm being connected to the second support portion, an oscillating member which is sandwiched between the other ends of the first vibrating arm and the second vibrating arm, and has openings, and detection arms which extend along a second axis perpendicular to the first axis from the inner walls of the openings of the oscillating member in plan view.

With this application example, the detection arms are provided in the openings of the oscillating member, reducing the size of the vibrating element and preventing the detection arms from coming into contact with the inner wall of a package when mounted in the package.

Application Example 2

In the vibrating element according to the application example of the invention, the thickness of each of the detection arms may be smaller than the thickness of each of the first vibrating arm and the second vibrating arm.

With this configuration, the thickness of each of the detection arms becomes smaller (thinner) than the thickness of each of the vibrating arms, making it possible to reduce the difference between the resonance frequency of in-plane vibration of the vibrating arms (driving vibration mode) and the resonance frequency of out-of-plane vibration of the detection arms (detection vibration mode) based on Coriolis force, a so-called dephasing frequency. Therefore, if the above-described vibrating element is used, it is possible to realize a high-sensitivity angular velocity sensor.

Application Example 3

In the vibrating element according to the application example of the invention, when the vibration direction of the bending vibration of the vibrating arms is the width direction of the vibrating arms, the width of each of the vibrating arms may be smaller than the thickness of each of the vibrating arms.

Alternatively, in another aspect, in the vibrating element according to the application example of the invention, the width of each of the first vibrating arm and the second vibrating arm may be smaller than the thickness of each of the first vibrating arm and the second vibrating arm.

With this configuration, unnecessary vibration of the vibrating arms in a direction other than a desired vibration direction is suppressed, and vibration leakage to the detection arms is reduced, realizing an angular velocity sensor with a small detection error.

Application Example 4

In the vibrating element according to the application example of the invention, the first vibrating arm and the second vibrating arm may vibrate in the second-axis direction, and when rotation is applied around the first axis, the detection arms vibrate in a direction perpendicular to the first axis and the second axis.

With this configuration, detection axes are present along the plane on which the vibrating element extends (the plane defined by the first axis and the second axis). For this reason, in the case of a sensor in which a plurality of detection axes (for example, the detection axes based on the first axis and the second axis) are necessary, it is not necessary that a vibrating element is mounted in a standing position (such that the plane on which the vibrating element extends is perpendicular to the detection axes), reducing the size of the sensor.

Application Example 5

In the vibrating element according to the application example of the invention, two or more vibrating members may be provided, each of the vibrating members having the oscillating members with the detection arms, and the vibrating arms connected to the oscillating member.

In another aspect, in the vibrating element according to application example of the invention, two vibrating elements may be arranged in parallel, and one vibrating element and the other vibrating element may vibrate in opposing directions.

With this configuration, a satisfactory vibration balance is obtained such that two or more vibrating members vibrate symmetrically, and vibration energy in the support portions is sufficiently attenuated. For this reason, there is little effect on the fixing portion for fixing the vibrating element to the package, stably operating the vibrating element.

Application Example 6

In the vibrating element according to the application example of the invention, the base material of the vibrating element may be quartz.

With this configuration, it is possible to obtain a small and thin vibrating element with excellent temperature characteristics.

Application Example 7

In the vibrating element according to the application example of the invention, the base material of the vibrating element may be an elastic member, and piezoelectric members may be formed in the vibrating arms and the detection arms.

In another aspect, in the vibrating element according to another application example of the invention, a piezoelectric member may be provided in at least one of the first vibrating arm, the second vibrating arm, and the detection arms.

With this configuration, a material for easily forming the main portion of the vibrating element can be selected, obtaining a high-productivity and low-cost vibrating element.

In the vibrating element according to the application example of the invention, the base material of the vibrating element may be quartz, and a piezoelectric member may be formed in either the vibrating arms or the detection arms.

With the above, when the detection arms extend in the crystal X-axis direction of quartz, the piezoelectric member is formed in the detection arms, easily detecting out-of-plane vibration. When the vibrating arms extend in the crystal Y-axis direction, the piezoelectric member is formed in the vibrating arms, easily driving in-plane vibration.

Application Example 8

This application example of the invention provides a vibrator. The vibrator has the vibrating element mounted therein.

Another aspect of the invention provides a vibrator. The vibrator includes the above-described vibrating element, and a package in which the vibrating element is mounted.

With this application example, it is possible to obtain a vibrator which becomes a thin angular velocity sensor with the rotation axis in a direction within the plane on which the vibrating element is formed.

Application Example 9

This application example of the invention provides an electronic apparatus including the above-described vibrating element.

With this application example, it is possible to provide an electronic apparatus including a small sensor with satisfactory detection sensitivity.

BRIEF DESCRIPTION OF THE DRAWINGS

The invention will be described with reference to the accompanying drawings, wherein like numbers reference like elements.

FIGS. 1A to 1C show a vibrating element of a first embodiment, and specifically.

FIGS. 2A to 2C illustrate the operation of the vibrating element of the first embodiment, and specifically.

FIGS. 3A to 3C show another example in the first embodiment, and specifically.

FIGS. 5A to 5C show a vibrating element of a second embodiment, and specifically.

FIGS. 6A to 6C show a vibrating element of a third embodiment, and specifically.

DESCRIPTION OF EXEMPLARY EMBODIMENTS

Hereinafter, embodiments of the invention will be described with reference to the drawings.

First Embodiment

Figure 1A:
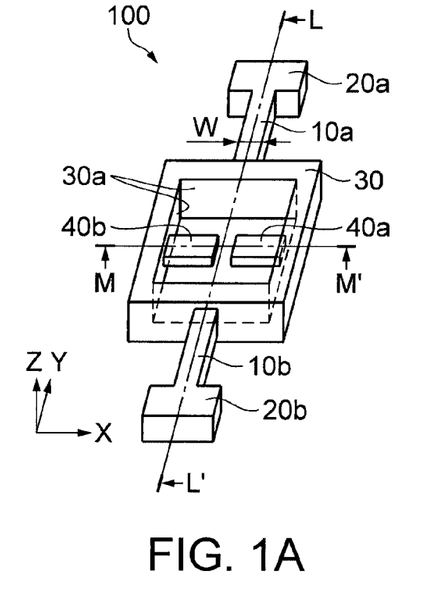
FIG. 1A is a schematic perspective view.
Figure 1B:
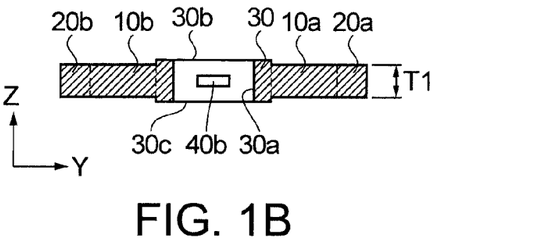
FIG. 1B is a sectional view of a vibrating arm.
Figure 1C:
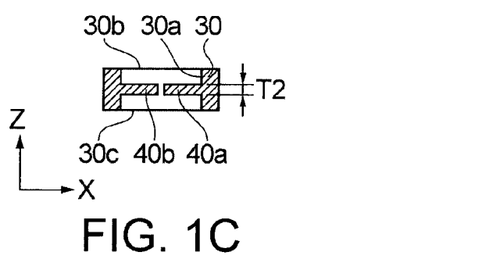
FIG. 1C is a sectional view of a detection arm.

FIGS. 1A to 1C show a vibrating element of this embodiment. Specifically, FIG. 1A is a schematic perspective view, and FIGS. 1B and 1C are schematic sectional views. In this embodiment, description will be provided as to a vibrating element 100, as an example, which is formed of a quartz substrate.

The vibrating element 100 is formed of a Z-cut substrate which is cut out along a plane defined by the X axis and the Y axis from among the X axis called the electrical axis of the quartz substrate, the Y axis called the mechanical axis of the quartz substrate, and the Z axis called the optical axis of the quartz substrate, and has a thickness in the Z-axis direction.

The vibrating element 100 includes vibrating arms 10a and 10b (first vibrating arm 10a and second vibrating arm 10b) which extend in the Y-axis direction as a first axis, the one end portions (the one ends) of the vibrating arms 10a and 10b being respectively connected to support portions 20a and 20b (first support portion 20a and second support portion 20b), and a tubular (frame-shaped) oscillating member 30 which is connected to the other end portions (the other ends) of the vibrating arms 10a and 10b. In other words, the oscillating member 30 is sandwiched between the other end of the vibrating arm 10a and the other end of the vibrating arm 10b.

As shown in FIG. 1C taken along the line M-M' of FIG. 1A, detection arms 40a and 40b extend from an inner wall 30a of the oscillating member 30 in a direction perpendicular to the extension direction of the vibrating arms 10a and 10b in plan view, that is, in the X-axis direction as a second axis.

Electrodes (not shown) are formed in the vibrating arms 10a and 10b and the detection arms 40a and 40b. The electrodes in the vibrating arms 10a and 10b are provided to drive the vibrating arms 10a and 10b to cause bending vibration within the X-Y plane, and the electrodes in the detection arms 40a and 40b are provided to detect vibration of the detection arms 40a and 40b based on Coriolis force caused by an angular velocity.

As shown in FIG. 1C taken along the line L-L' of FIG. 1A, the oscillating member 30 is formed in a tubular shape having openings 30b and 30c in the Z-axis direction. Although the oscillating member 30 of this example has a rectangular tubular shape in plan view, the oscillating member 30 may have a cylindrical shape or a polygonal tubular shape. There is no particular limitation on the shape of the oscillating member 30.

It is preferable that the following relationship is established between the width W (FIG. 1A) in the X-axis direction and the thickness T1 (FIG. 1B) in the Z-axis direction of each of the vibrating arms 10a and 10b of the vibrating element 100 and the thickness T2 (FIG. 1C) in the Z-axis direction of each of detection arms 40a and 40b.

$W<T1$
$T2<T1$

If the width W of each of the vibrating arms 10a and 10b is set to be smaller than the thickness T1 of each of the vibrating arms 10a and 10b, intrinsically, in the vibrating arms 10a and 10b which are driven in the X-axis direction, vibration (unnecessary vibration) in the Z-axis direction (out-of-plane direction) is suppressed, reducing vibration leakage to the detection arms 40a and 40b.

Thus, the vibrating element 100 suppresses the application of vibration leakage from the vibrating arms 10a and 10b to the detection arms 40a and 40b which vibrate in the Z-axis direction (out-of-plane direction) on the basis of Coriolis force caused by a rotation angular velocity, realizing an angular velocity sensor with a small detection error.

In the vibrating element 100, the thickness T2 of each of the detection arms 40a and 40b is smaller than the thickness T1 of each of the vibrating arms 10a and 10b, making it possible to reduce the difference between the resonance frequency in the vibration direction (X-axis direction) of the vibrating arms 10a and 10b and the resonance frequency in the vibration direction (Z-axis direction) of the detection arms 40a and 40b, that is, the dephasing frequency. Therefore, it is possible to realize a high-sensitivity angular velocity sensor.

Next, the actuation of this embodiment will be described with reference to FIGS. 2A to 2C.

Figure 2A:
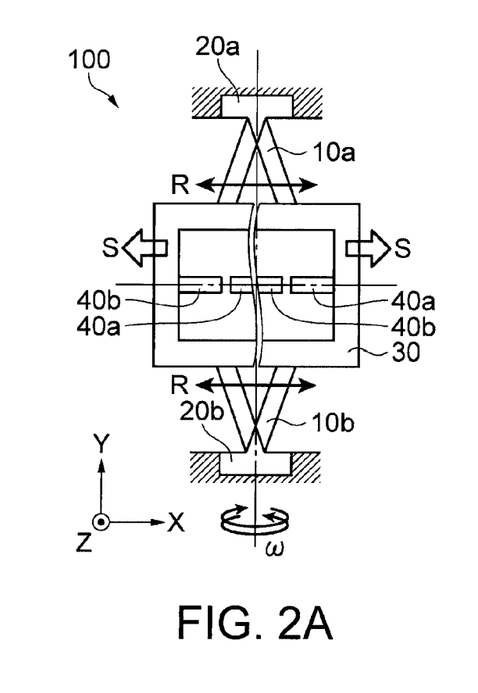
FIG. 2A is a schematic plan view.

The vibrating arms 10a and 10b of the vibrating element 100 are driven to undergo bending vibration in an arrow R direction shown in FIG. 2A, that is, in the X-axis direction. With this vibration, the oscillating member 30 which is connected to the vibrating arms 10a and 10b oscillates in an arrow S direction.

Figure 2B:
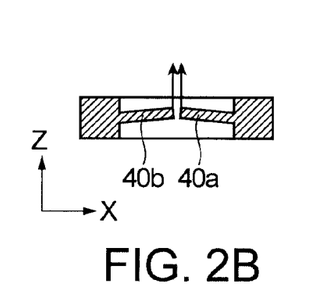
FIGS. 2B and 2C are sectional views of a detection arm.
Figure 2C:
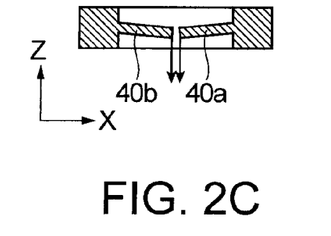

If the vibrating element 100 which is vibrating in such a manner is rotated around the Y axis at an angular velocity ω, the detection arms 40a and 40b which are provided inside the oscillating member 30 start bending vibration in the Z-axis direction on the basis of Coriolis force, as shown in FIGS. 2B and 2C. Bending vibration of the detection arms 40a and 40b is detected and calculated to obtain the angular velocity ω.

As described above, the detection arms 40a and 40b are provided inside the oscillating member 30 and simply reciprocate in the X-axis direction together with the oscillating member 30. The relationship $W<T1$ is established between the width W and the thickness T1 of each of the vibrating arms 10a and 10b, increasing rigidity with respect to the out-of-plane direction (Z-axis direction) of the vibrating arms 10a and 10b. Thus, the vibration of the oscillating member in the out-of-plane direction (Z-axis direction) is suppressed. Therefore, in a state where no rotation angular velocity is loaded, the vibration in the out-of-plane direction (Z-axis direction) of the detection arms 40a and 40b inside the oscillating member 30 is also suppressed, detecting the rotation angular velocity with high accuracy.

The detection arms 40a and 40b simply reciprocate (oscillate) in the X-axis direction as a single body with the oscillating member 30, and even when the sectional shapes of the detection arms 40a and 40b are not formed in an accurate rectangular shape due to manufacturing variations, it is possible to suppress the vibration of the detection arms 40a and 40b in the out-of-plane direction (Z-axis direction).

In this embodiment, the number of detection arms is not limited to two, and one or three or more detection arms may be provided. The vibrating arm 10a and the vibrating arm 10b may not be on the same line (may be at different positions in the X-axis direction).

Figure 3A:
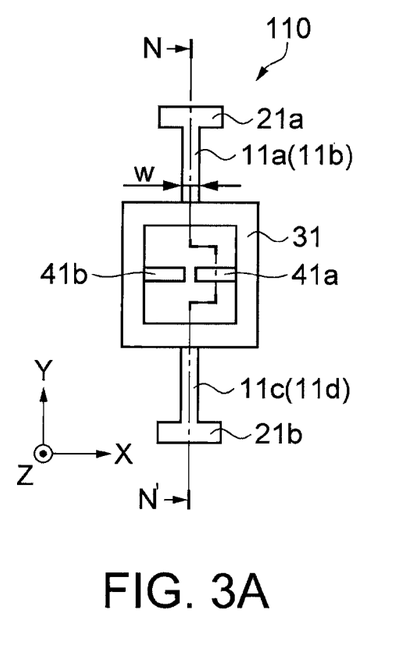
FIG. 3A is a schematic plan view.
Figure 3B:
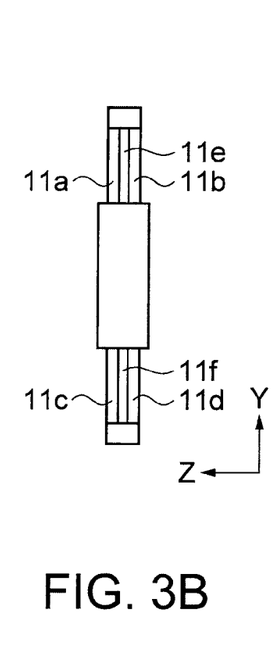
FIG. 3B is a schematic side view.
Figure 3C:
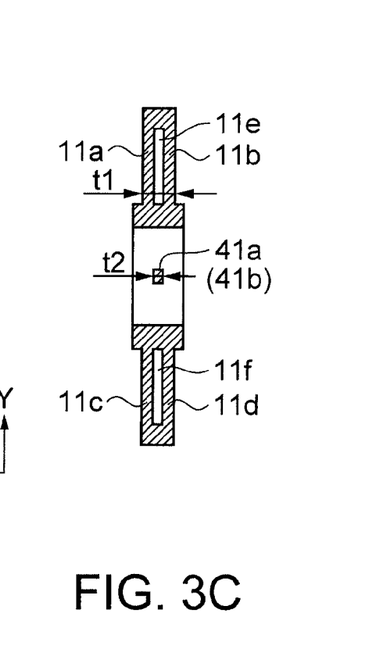
FIG. 3C is a schematic sectional view.

Although in this embodiment, a case has been described where the vibrating element 100 includes the singular vibrating arms (vibrating arms 10a and 10b), as shown in FIGS. 3A to 3C, the respective vibrating arms may be provided in a plural number.

FIG. 3A is a schematic plan view of a vibrating element 110 which includes a plurality of vibrating arms 11a, 11b, 11c, and 11d, an oscillating member 31, detection arms 41a and 41b, and support portions 21a and 21b. FIG. 3B is a side view, and FIG. 3C is a sectional view taken along the line N-N' of FIG. 3A.

The vibrating element 110 includes, as a vibrating arm, vibrating arms (first vibrating arm) 11a and 11b on one side and vibrating arms (second vibrating arm) 11c and 11d on the other side. The vibrating arms 11a and 11b are separated from each other with a space 11e interposed therebetween. Similarly, the vibrating arms 11c and 11d are separated from each other with a space 11f interposed therebetween. Other parts are the same as those in the above-described first embodiment.

In this vibrating element 110, it is preferable that the following relationship is established between the width w (FIG. 3A) in the X-axis direction and the thickness t1 (FIG. 3C) in the Z-axis direction of each of the vibrating arms 11a and 11b and the vibrating arms 11c and 11b and the thickness t2 (FIG.

3C) in the Z-axis direction of each of the detection arms 41a and 41b.

w<t1
t2<t1

Next, a method of manufacturing the vibrating element 100 of this embodiment will be described. FIGS. 4A to 4G are sectional views showing a manufacturing method of this embodiment taken along the lines L-L' and M-M' of FIG. 1A.

Figure 4A:
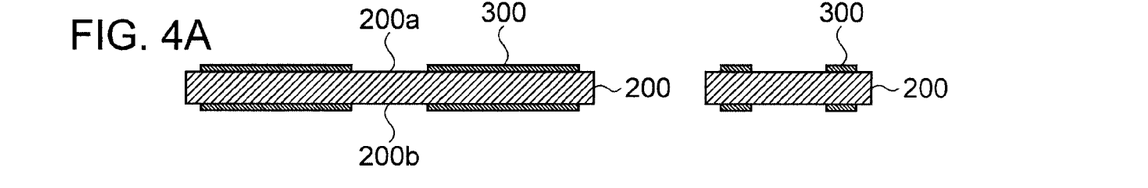
FIGS. 4A to 4G are sectional views showing a method of manufacturing the vibrating element of the first embodiment.
Figure 4B:
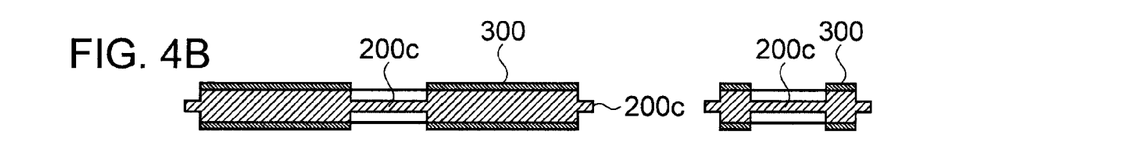

First, a quartz piece 200 is prepared, and a first etching mask 300 for forming the exterior of the vibrating element 100 is formed on both surfaces 200a and 200b of the quartz piece 200, as shown in FIG. 4A. Next, the quartz piece 200 having the first etching mask 300 is etched through wet etching or dry etching. At this time, as shown in FIG. 4B, etching is carried out such that a portion 200c corresponding to the thickness of each of the detection arms 40a and 40b remains in the middle portion through half etching.

Figure 4C:
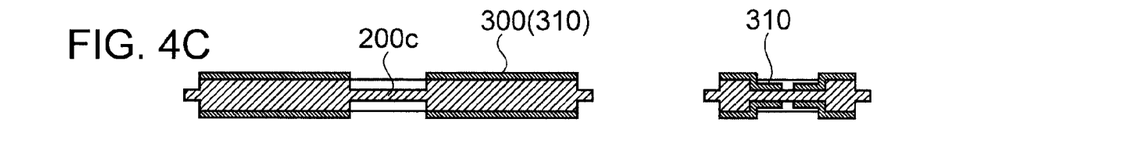

Next, as shown in FIG. 4C, a second etching mask 310 is formed in the sectional portion taken along the line M-M' which become the detection arms 40a and 40b. At this time, although the first etching mask 300 remains and the second etching mask 310 is formed in the portions corresponding to the detection arms 40a and 40b, the first etching mask 300 may be delaminated and an etching mask shown in FIG. 4C may be formed again as the second etching mask 310.

The quartz piece 200 on which the above-described second etching mask 310 is formed is re-etched.

Figure 4D:
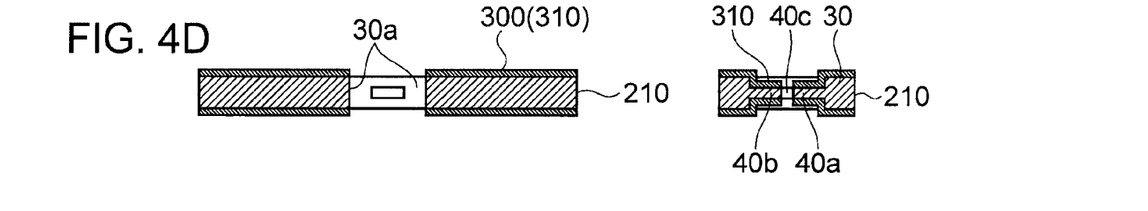
Figure 4E:
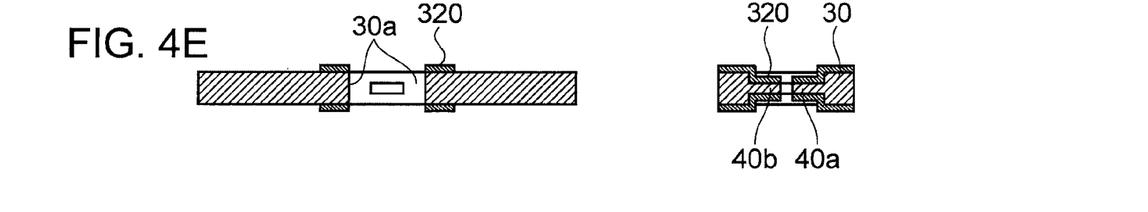

Etching is carried out by the same method as the above-described exterior half etching. With re-etching, as shown in FIG. 4D, an exterior 210 and an inner wall 30a as the interior of the oscillating member 30 are formed, and a through portion 40c is formed between the detection arms 40a and 40b. Next, as shown in FIG. 4E, a third etching mask 320 is formed to etch the portions corresponding to the front and rear surfaces of the vibrating arms 10a and 10b and the support portions 20a and 20b. The third etching mask 320 may be formed by removing a portion of the first etching mask 300, or the second etching mask 310 may be delaminated and the third etching mask 320 may be formed in the portions to be unetched.

Figure 4F:
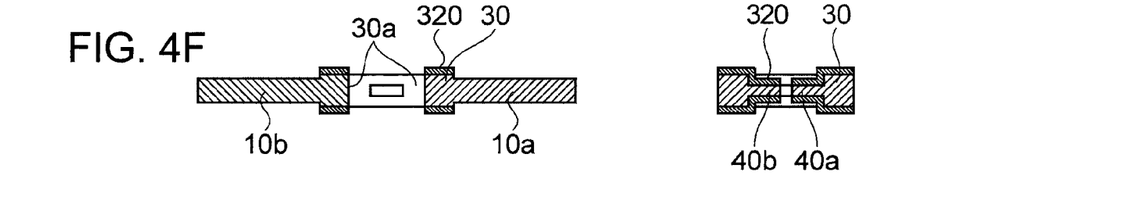
Figure 4G:
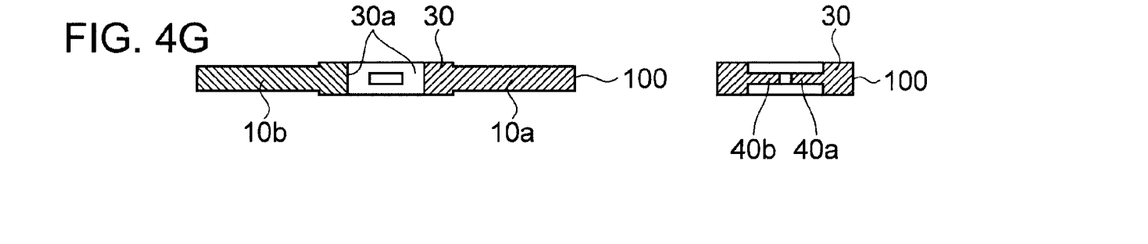

As shown in FIG. 4F, etching is carried out until each of the support portions 20a and 20b and the vibrating arms 10a and 10b exposed from the third etching mask 320 becomes a predetermined thickness. In this way, the vibrating element 100 shown in FIG. 4G is formed.

Second Embodiment

Figure 5A:
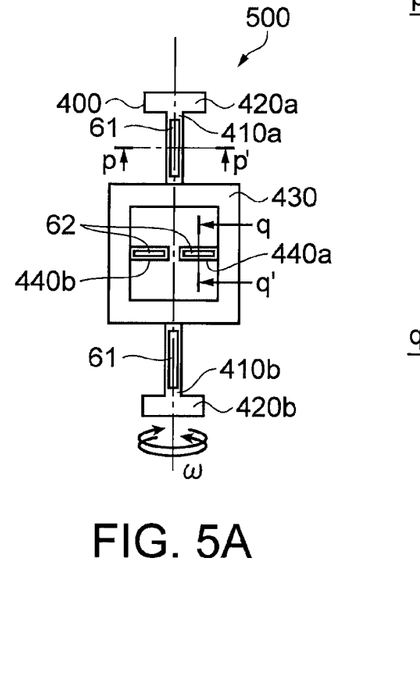
FIG. 5A is a schematic plan view.
Figure 5B:
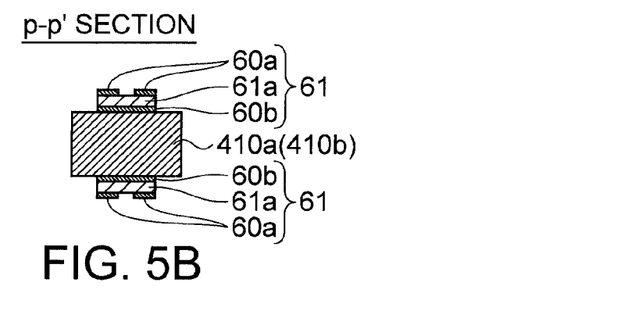
FIG. 5B is an enlarged sectional view of a vibrating arm.
Figure 5C:
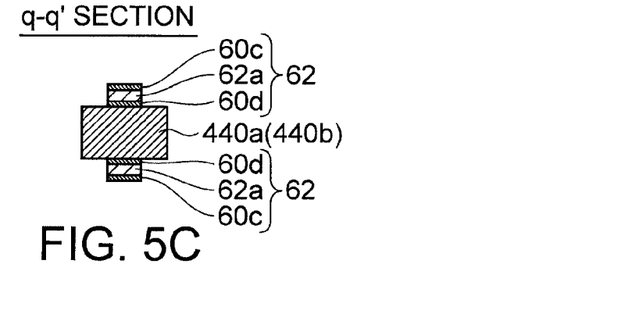
FIG. 5C is an enlarged sectional view of a detection arm.

As another embodiment, a vibrating element will be described in which a piezoelectric member with an elastic material as a base material is attached to the vibrating arm and detection arms. FIGS. 5A to 5C show a vibrating element of a second embodiment. FIG. 5A is a plan view, FIG. 5B is an enlarged sectional view (vibrating arm) taken along the line p-p', and FIG. 5C is an enlarged sectional view (detection arm) taken along the line q-q'.

A vibrating element 500 is constituted by a piezoelectric member in which an elastic piece 400 with an elastic material, for example, silicon, as a base material is adhered to the vibrating arms and the detection arms.

As in the above-described first embodiment, the elastic piece 400 includes a vibrating arm (first vibrating arm) 410a and a vibrating arm (second vibrating arm) 410b. Support portions 420a and 420b are respectively connected to the one end portions of the vibrating arms 410a and 410b, and an oscillating member 430 is connected to the other end portions of the vibrating arms 410a and 410b. Inside the oscillating member 430 are provided detection arms 440a and 440b which extend in a direction perpendicular to the extension direction of the vibrating arms 410a and 410b.

A piezoelectric member is formed of a material which is deformed at the time of application of an electric field, for example, PZT or the like. Driving piezoelectric members 61 are provided in the vibrating arms 410a and 410b, and detection piezoelectric members 62 are provided in the detection arms 440a and 440b.

As shown in FIG. 5B, each of the driving piezoelectric members 61 includes upper electrodes 60a which are divided by a piezoelectric member 61a, and a lower electrode 60b. The driving piezoelectric members 61 are adhered to the vibrating arms 410a and 410b. As shown in FIG. 5C, each of the detection piezoelectric members 62 includes upper electrodes 60c which are divided by a piezoelectric member 62a, and a lower electrode 60d. The detection piezoelectric members 62 are adhered to the detection arms 440a and 440b.

The positions of the piezoelectric members provided as described above are set when the angular velocity W is detected which has the rotation axis along the extension direction of the vibrating arms 410a and 410b of the vibrating element 500. The actuation of the vibrating element 500 is the same as the actuation in the above-described first embodiment, thus description thereof will be omitted.

The base material of the vibrating element 500 may be a quartz substrate. When the vibrating element 500 is formed of a quartz substrate, the vibrating arms 410a and 410b may be driven by piezoelectric members, and in the detection arms 440a and 440b, an electrode film may be formed on the quartz substrate. Alternatively, when the vibrating element 500 is formed of a quartz substrate, in the vibrating arms 410a and 410b, an electrode film may be formed as a driving electrode on the quartz substrate, and piezoelectric members may be provided in the detection arm 440a to 440b to detect vibration.

Third Embodiment

Figures 6A, 6B, 6C:
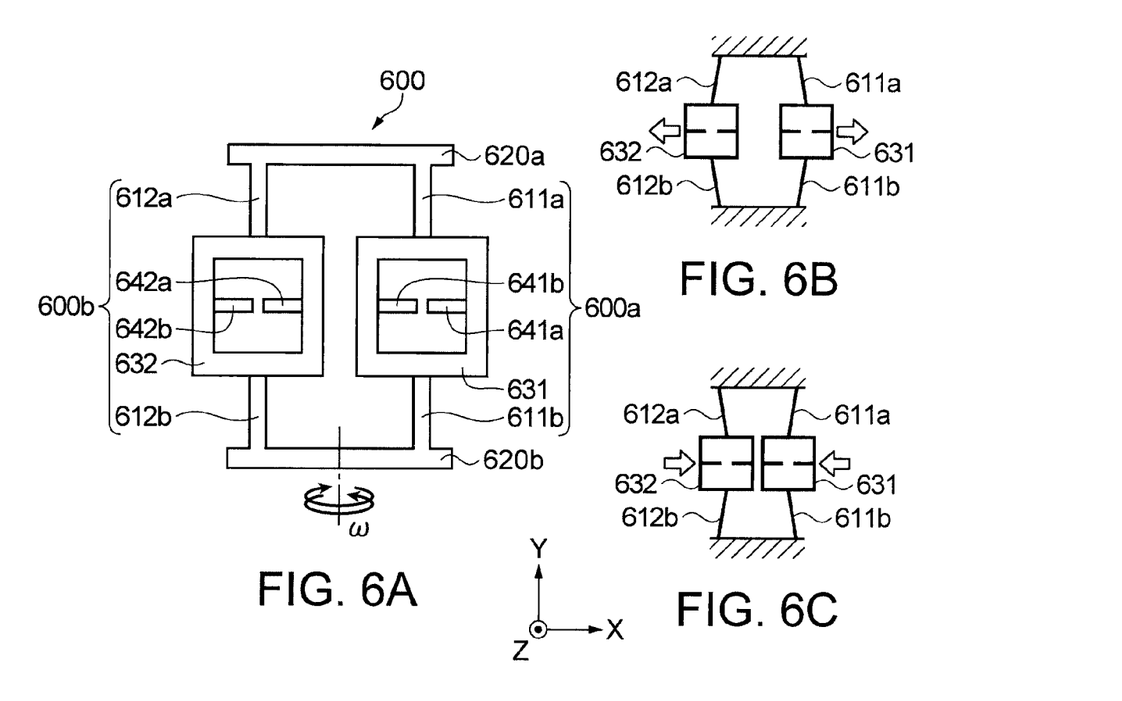
FIG. 6A is a schematic plan view.
FIGS. 6B and 6C are operation schematic views.

Description will be provided as to an embodiment of a vibrating element in which the vibrating element 100 of the first embodiment or the vibration detection portion of the vibrating element 500 of the second embodiment is provided in a plural number. FIGS. 6A to 6C show a vibrating element of a third embodiment. FIG. 6A is a schematic plan view, and FIGS. 6B and 6C are operation schematic views.

The vibrating element of the third embodiment is not particularly limited insofar as the vibrating element is formed of a piezoelectric material, as in the first embodiment, or the vibrating element includes the piezoelectric members formed of an elastic material, as in the second embodiment. Here, description will be provided as to a case where quartz as a piezoelectric material is used as a base material.

A vibrating element 600 includes two vibrating members of a first vibrating member 600a and a second vibrating member 600b each having an oscillating member, detection arms, and vibrating arms.

Specifically, the vibrating element 600 includes a first oscillating member 631 and a second oscillating member 632, first-vibrating-member vibrating arms 611a (first vibrating arm) and 611b (second vibrating arm) and second-vibrating-member vibrating arms 612a (first vibrating arm) and 612b (second vibrating arm) which extend in the Y-axis direction, the one end portions (the other ends) thereof are respectively connected to the oscillating members, and common support portions 620a (first support portion) and 620b (second support portion) which are connected to the end portions of the first-vibrating-member vibrating arms 611a and 611b and the second-vibrating-member vibrating arms 612a and 612b opposite to the oscillating members.

The first oscillating member 631 and the second oscillating member 632 include detection arms 641a, 641b, 642a, and 642b extending in the X-axis direction in the openings.

The first oscillating member 631 is sandwiched between the other end of the first-vibrating-member vibrating arm 611a and the other end of the first-vibrating-member vibrating arm 611b. The second oscillating member 632 is sandwiched between the other end of the second-vibrating-member vibrating arm 612a and the other end of the second-vibrating-member vibrating arm 612b.

The vibrating arms 611a, 611b, 612a, and 612b repeat oscillation (vibration) shown in FIGS. 6B and 6C. That is, out-of-phase (reversed-phase) vibration modes are given such that the first oscillating member 631 and the second oscillating member 632 oscillate in opposing directions. In this state, if the angular velocity ω with a rotation axis along the Y-axis direction shown in FIG. 6A is loaded, displacement in the Z-axis direction occurs in the detection arms 641a, 641b, 642a, and 642b on the basis of Coriolis force, causing bending vibration.

The bending vibration is detected to calculate the angular velocity ω.

In the third embodiment, the bonded portion of the first-vibrating-member vibrating arm 611a and the second-vibrating-member vibrating arm 612a in the support portion 620a and the bonded portion of the first-vibrating-member vibrating arm 611b and the second-vibrating-member vibrating arm 612b in the support portion 620b undergo out-of-phase (reversed-phase) vibration. Thus, it is possible to reduce vibration leakage to the support portions 620a and 620b, and there is little effect on the fixing portion for fixing the vibrating element 600 to the package, stably operating the vibrating element 600.

Although in the third embodiment, the vibrating element 600 has been described in which the two vibrating members of the first vibrating member 600a and the second vibrating member 600b are provided, even when three or more vibrating members are provided, the same operation can be carried out, obtaining a high-sensitivity vibrating element. In this case, from the viewpoint of satisfactory vibration balance, it is preferable that even-numbered vibrating members are provided.

Vibrator Manufacturing Method

Figure 7:
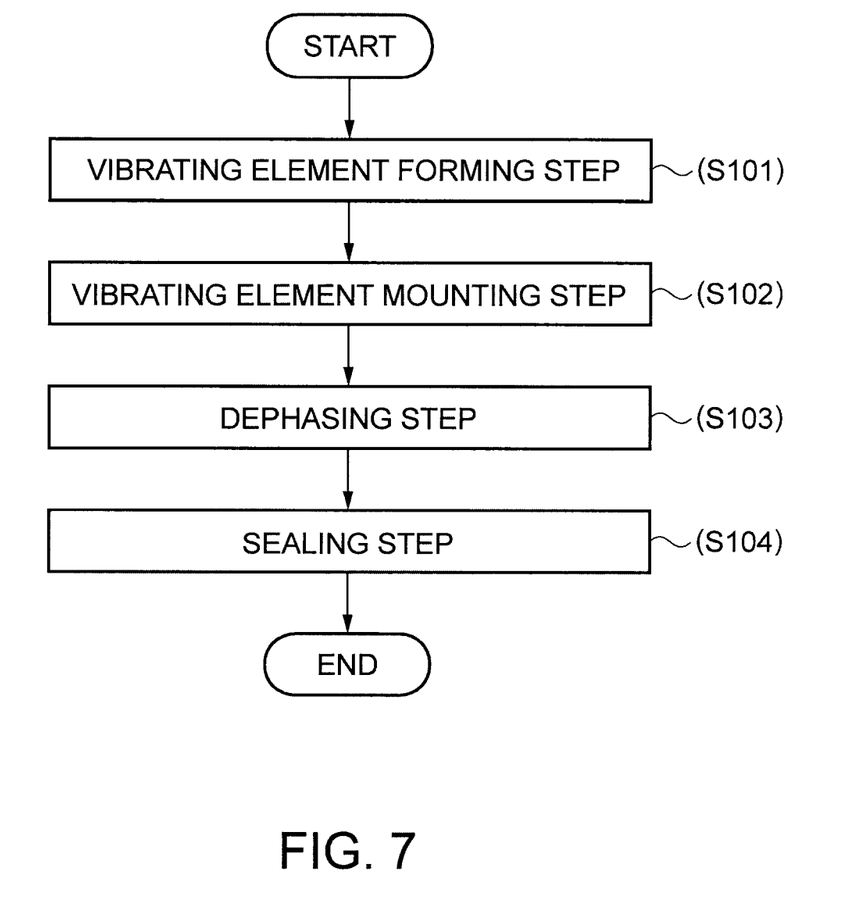
FIG. 7 is a flowchart showing a process for manufacturing a vibrator.

Next, a method of manufacturing an angular velocity sensor which is a vibrator using the above-described vibrating element 100, 500, or 600 will be described. FIG. 7 is a flowchart showing a process for manufacturing an angular velocity sensor. FIGS. 8A to 8D are sectional views showing a method of manufacturing an angular velocity sensor.

Vibrating Element Forming Step

Figure 8A:
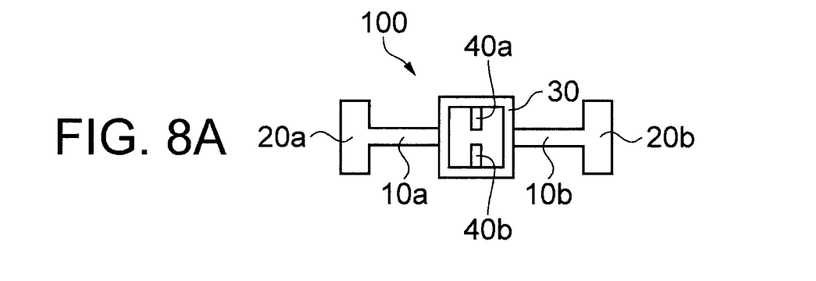
FIGS. 8A to 8D are sectional views showing a method of manufacturing a vibrator.

First, in a vibrating element forming step (S101), the planar vibrating element 100 shown in FIG. 8A is formed. The vibrating element 100 is formed from a quartz substrate through photolithography and etching. An Au film which becomes an electrode is formed on the surface of the formed quartz piece through vapor deposition, sputtering, CVD, or the like, and a predetermined electrode film is formed through photolithography and etching. As the electrode film, Cu, Ag, W, or the like may be used.

Vibrating Element Mounting Step

Figure 8B:
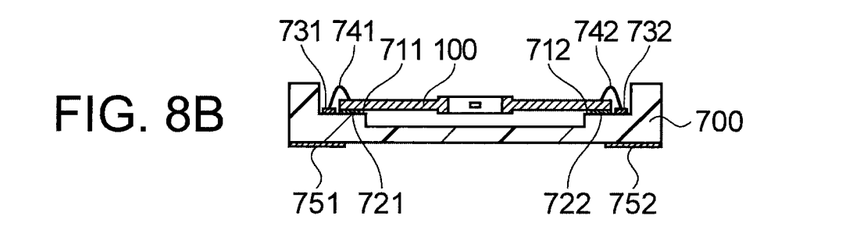

Next, the process progresses to a vibrating element mounting step (S102). As shown in FIG. 8B, the support portions 20a and 20b of the vibrating element 100 are placed on placing portions 711 and 712 inside a package 700 such that connection electrodes (not shown) formed on one surface of the support portions 20a and 20b turn toward the opening of the package 700, and the vibrating element 100 is adhered to the package 700 through adhesives 721 and 722.

Next, wire bonding is carried out to electrically connect the connection electrodes of the vibrating element 100 and electrodes 731 and 732 provided in the placing portions 711 and 712 to each other through conductive wires 741 and 742. The electrodes 731 and 732 are electrically connected to external connection electrodes 751 and 752 outside the package 700 through wiring lines (not shown).

Dephasing Step

Figure 8C:
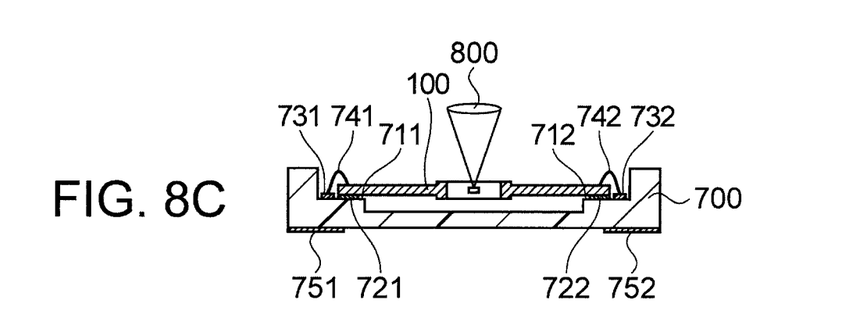

Next, the process progresses to a dephasing step (S103). As shown in FIG. 8C, the dephasing step (S103) is carried out while irradiating laser light 800, such as a YAG laser, from a laser device (not shown) onto an adjustment film (not shown) which is formed of the same Au film as the electrode film of the vibrating element 100 in the end portions of the detection arms 40a and 40b, and removing a portion of the adjustment film. The frequency of detected vibration (bending vibration) of the detection arms 40a and 40b is set to be lower than a desired frequency by further providing the adjustment films in the end portions of the detection arms 40a and 40b in advance. Laser light 800 is irradiated and a portion of the adjustment film is removed, such that the mass of the adjustment film is reduced. Then, adjustment is done such that the frequency of detected vibration of the detection arms 40a and 40b increases. As the method of removing the adjustment film, in addition to a YAG laser, an electron beam, reverse sputtering, or the like may be used.

Sealing Step

Figure 8D:
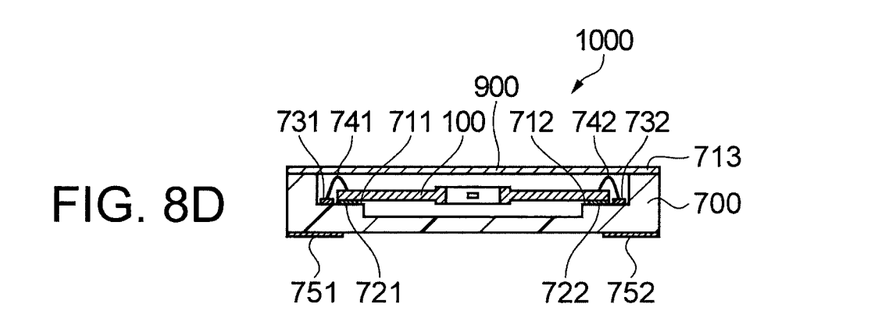

Next, the process progresses to a sealing step (S104). In the sealing step (S104), the package 700 in which the vibrating element 100 is mounted is sealed airtightly. As shown in FIG. 8D, when a cover 900 arranged on the top surface of the package 700 is made of a metal, such as kobar, the bonding portions of the cover 900 and the package 700 are seam-welded to seal the package 700 airtightly in an inert atmosphere or in a reduced-pressure atmosphere. When the cover 900 is made of transparent glass, low-melting-point glass is arranged on the bonding surface 713 of the cover 900 and the package 700, bonding is done through melting of low-melting-point glass to seal the package 700 airtightly in an inert atmosphere or in a reduced-pressure atmosphere. In this way, an angular velocity sensor 1000 is completed.

When the cover 900 is made of transparent glass, laser light can be transmitted through the cover 900 and can be irradiated onto the adjustment film of the vibrating element 100. Thus, the dephasing step can be performed after the sealing step.

Electronic Apparatus

Description will be provided as to an electronic apparatus including the above-described vibrating element. The drawing will be omitted.

The above-described vibrating element can be suitably used in electronic apparatuses, such as a digital still camera, a video camera, a navigation system, a pointing device, a game controller, a mobile phone, an electronic book, a personal computer, a television, a video recorder, a pager, an electronic organizer, an electronic calculator, a word processor, a work station, a video phone, a POS terminal, and a touch panel-equipped apparatus, as a sensing device or a timing device. In all cases, it is possible to provide an electronic apparatus which exhibits the effects described in the above-described embodiments.

For example, according to the above-described vibrating element, it is possible to provide an electronic apparatus including a small sensor with satisfactory detection sensitivity.

The entire disclosure of Japanese Patent Application No. 2010-000450, filed Jan. 5, 2010 and No. 2010-241837, filed Oct. 28, 2010 are expressly incorporated by reference herein.

What is claimed is:

1. A vibrating element comprising:
a first support portion and a second support portion;
a first vibrating arm which extends along a first axis, one end of the first vibrating arm being connected to the first support portion;
a second vibrating arm which extends along the first axis, one end of the second vibrating arm being connected to the second support portion;
an oscillating member which is sandwiched between the other ends of the first vibrating arm and the second vibrating arm, and which has openings, and
detection arms which extend along a second axis in a second axis direction perpendicular to the first axis from the inner walls of the openings of the oscillating member in plan view, wherein
the first vibrating arm and the second vibrating arm vibrate in the second axis direction, and
when rotation is applied around the first axis, the detection arms vibrate in a direction perpendicular to the first axis and the second axis.

2. The vibrating element according to claim 1, wherein a thickness of each of the detection arms is smaller than a thickness of each of the first vibrating arm and the second vibrating arm.

3. The vibrating element according to claim 1, wherein a width of each of the first vibrating arm and the second vibrating arm is smaller than a thickness of each of the first vibrating arm and the second vibrating arm.

4. The vibrating element according to claim 1, wherein a base material of the vibrating element is quartz.

5. The vibrating element according to claim 1, wherein a piezoelectric member is provided in at least one of the first vibrating arm, the second vibrating arm, and the detection arms.

6. A vibrator comprising:
the vibrating element according to claim 1; and
a package in which the vibrating element is mounted.

7. A vibrating element comprising:
a first support portion and a second support portion;
a first vibrating arm which extends along a first axis, one end of the first vibrating arm being connected to the first support portion;
a second vibrating arm which extends along the first axis, one end of the second vibrating arm being connected to the second support portion;
an oscillating member which is sandwiched between the other ends of the first vibrating arm and the second vibrating arm, and which has openings, and
detection arms which extend along a second axis perpendicular to the first axis from the inner walls of the openings of the oscillating member in plan view,
wherein two of the vibrating element are arranged in parallel, and
one vibrating element and the other vibrating element vibrate in opposing directions.

8. The vibrating element according to claim 7, wherein a thickness of each of the detection arms is smaller than a thickness of each of the first vibrating arm and the second vibrating arm.

9. The vibrating element according to claim 7, wherein a width of each of the first vibrating arm and the second vibrating arm is smaller than a thickness of each of the first vibrating arm and the second vibrating arm.

10. The vibrating element according to claim 7, wherein a base material of the vibrating element is quartz.

11. The vibrating element according to claim 7, wherein a piezoelectric member is provided in at least one of the first vibrating arm, the second vibrating arm, and the detection arms.

12. A vibrator comprising:
the vibrating element according to claim 7; and
a package in which the vibrating element is mounted.

* * * * *